United States Patent
Han et al.

(10) Patent No.: US 7,867,573 B2
(45) Date of Patent: Jan. 11, 2011

(54) METHOD OF AQUEOUS COATING OF PLASTIC SHEET SURFACE FOR VEHICLE INTERIOR EQUIPMENT

(75) Inventors: In Soo Han, Gyeonggi-do (KR); Kie Youn Jeong, Gyeonggi-do (KR); Mi Jung Yun, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 1047 days.

(21) Appl. No.: 11/648,087

(22) Filed: Dec. 29, 2006

(65) Prior Publication Data
US 2008/0063883 A1 Mar. 13, 2008

(30) Foreign Application Priority Data
Sep. 13, 2006 (KR) .................. 10-2006-0088706

(51) Int. Cl.
*B05D 7/00* (2006.01)
(52) U.S. Cl. .................. 427/387; 427/407.1
(58) Field of Classification Search .......... 427/384, 427/387, 407.1
See application file for complete search history.

(56) References Cited

U.S. PATENT DOCUMENTS

| | | | |
|---|---|---|---|
| 4,981,730 A | 1/1991 | Zaleski | |
| 5,412,000 A | 5/1995 | Hellmann et al. | |

FOREIGN PATENT DOCUMENTS

| | | |
|---|---|---|
| JP | 04-351681 | 12/1992 |
| JP | 2004-099654 | 4/2004 |
| KR | 10-1997-0042828 | 7/1997 |
| KR | 10-2004-0073698 | 8/2004 |

*Primary Examiner*—Thao T. Tran
(74) *Attorney, Agent, or Firm*—Edwards Angell Palmer & Dodge LLP; Peter F. Corless

(57) ABSTRACT

The present invention relates to methods of forming an aqueous coating on a plastic sheet surface for vehicle interior equipment, comprising the steps of: coating the plastic sheet with a primary composition, the primary composition comprising chlorinated aqueous olefin resin; baking the resulting plastic sheet; coating the baked sheet with a secondary composition, the secondary composition comprising aliphatic urethane; and baking the resulting plastic sheet.

10 Claims, 1 Drawing Sheet

METHOD OF AQUEOUS COATING OF PLASTIC SHEET SURFACE FOR VEHICLE INTERIOR EQUIPMENT

CROSS-REFERENCE TO RELATED APPLICATIONS

This application claims the benefit of Korean Patent Application No. 10-2006-0088706 filed with the Korean Intellectual Property Office on Sep. 13, 2006, the disclosure of which is incorporated herein by reference

BACKGROUND OF THE INVENTION

1. Field of the Invention

The present invention relates to a method of forming an aqueous coating on a plastic sheet surface for vehicle interior equipment, and more particularly, to a method of forming an aqueous coating on a plastic sheet surface by performing a coating process in two steps on the plastic sheet.

2. Background

In general, extrusion sheets or calendaring sheets made of polyvinylchloride (PVC) or polyvinylchloride (PVC)/acrylonitrile butadiene styrene (ABS) copolymer have been widely used as surface materials of vehicle interior parts, such as instrument panel, door trim panel, headlining, etc. However, such sheets include a great quantity of organic solvents that cause odors inside the vehicle, volatile organic compounds, etc. The volatilities and some compounds included in paints may adversely affect users health, resulting in decreased scope of users choice.

Recently, such sheets including organic solvents have been rapidly substituted with thermoplastic polycarbonate urethane ("TPO") sheets. TPO sheets are advantageous in terms of environmental friendliness, light-weightiness, fogging, low-temperature impact toughness and odor.

Surface materials for vehicle interior equipment are generally subjected to a surface coating process to improve their physical properties such as friction and wear resistance, chemical properties such as chemical resistance, solvent resistance, etc., light resistance. Surface coating process also serves to lower gloss for ensuring driver's visual field appropriately. It also serves to unify the color of peripheral parts.

Conventionally, as depicted in FIG. 1, TPO sheets are coated by three steps: pretreatment coating, base coating and top coating. More particularly, a TPO sheet is subjected to pretreatment, such as surface treatment including flame process, ozone process, plasma process, etc., or oil primer treatment with chlorinated polyolefin resins. The pretreated sheet is subjected to base coating material of acrylic resins and then a top coating material of urethane resins. This is why the TPO sheet shows inferior adhesion property due to its non-polarization and high crystallization in terms of molecular structure.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

The present inventors have studied to resolve the problems of the odors and the contaminants cased by the volatile organic compounds and to simplify the complicated coating process. Through intensive studies, the present inventors have discovered a method of forming a coated film that has excellent light resistance, scratch resistance and superior thermoforming properties of high elongation and prevents environmental contamination by performing the coating process in two steps on the plastic sheet surface using an aqueous primary composition and an aqueous secondary composition.

In one aspect, the present invention provides a method of forming an aqueous coating on a plastic sheet surface for vehicle interior equipment, comprising the steps of: coating the plastic sheet with a primary composition, the primary (or primer) composition comprising chlorinated aqueous olefin resin; baking the resulting plastic sheet; coating the baked sheet with a secondary composition, the secondary composition comprising aliphatic urethane; and baking the resulting plastic sheet.

Preferably, the primary composition may comprise 30-65 weight % of chlorinated aqueous olefin resin, 2-10 weight % of polyurethane resin, 1-5 weight % of aqueous silicon resin, 0.5-2.0 weight % of aqueous stabilizing agent and 30-60 weight % of distilled water.

Also preferably, the secondary composition may comprise 40-60 weight % of aliphatic urethane, 0.1-5.0 weight % of silicon polyol for reforming aliphatic urethane, 3-5 weight % of N-methyl-2-pyrolidone, 0.1-1.0 weight % of neutralizing agent and 30-50 weight % of distilled water.

A preferred example of the plastic sheet is an aqueous polyurethane comprising 40-65 weight % of water dispersible polyester urethane dispersion, 2-20 weight % of water dispersible polyisocyanate crosslinking agent, 5-30 weight % of silicon oxide or urea polymer, 0.1-5.0 weight % of antifoaming agent, 1-10 weight % of leveling agent and 0.5-10.0 weight % of thickening agent.

Preferably, the chlorinated aqueous olefin resin may have a chlorine content of 10% to 30% and a carbon number of 1 to 10.

Suitably, the aliphatic urethane may have a carbon number of 80-120 and an elongation of 600% to 900%.

In a preferred embodiment of the present invention, the baking after coating with primary composition may be carried out at 130-150° C. for one to two minutes.

Also, the baking after coating with the secondary composition may preferably be carried out at 140-150° C. for two minutes to three minutes and forty seconds.

Preferably, 10-30 parts by weight of the primary composition may be used relative to 100 parts by weight of the plastic sheet.

Also preferably, 20-30 parts by weight of the secondary composition may be used relative to 100 parts by weight of the plastic sheet.

Aqueous coated plastic sheets prepared by the methods as described above have an elongation of, preferably, 600-800% and a gloss of, preferably, 1.2-1.8' based on a 60° gloss in appearance.

In another aspect, the present invention provides an aqueous coated plastic sheet comprising: a primary (or primer) coating formed on the plastic sheet and a secondary coating formed on the primary coating, wherein the primary coating is made of a primary composition comprising chlorinated aqueous olefin resin and the secondary coating is made of a secondary composition comprising aliphatic urethane.

In such aqueous coated plastic sheets, preferably, the primary (or primer) composition may comprise 30-65 weight % of chlorinated aqueous olefin resin, 2-10 weight % of polyurethane resin, 1-5 weight % of aqueous silicon resin, 0.5-2.0 weight % of aqueous stabilizing agent and 30-60 weight % of distilled water.

Also preferably, the secondary composition may comprise 40-60 weight % of aliphatic urethane, 0.1-5.0 weight % of silicon polyol for reforming aliphatic urethane, 3-5 weight % of N-methyl-2-pyrolidone, 0.1-1.0 weight % of neutralizing agent and 30-50 weight % of distilled water.

In another aspect, motor vehicles are provided that comprise a described coated sheet.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like. The present coated sheets will be particularly useful with a wide variety of motor vehicles.

Other aspects of the invention are discussed infra.

DETAILED DESCRIPTION OF THE PREFERRED EMBODIMENTS

Figure 1:
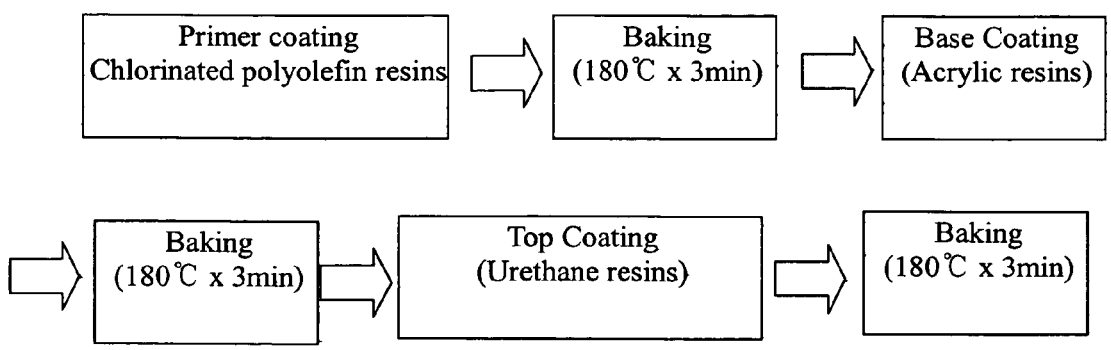
FIG. 1 is a schematic diagram depicting a conventional three-step coating method.

As discussed above, in one aspect, the present invention provides methods of forming an aqueous coating on a plastic sheet surface for vehicle interior equipment, comprising the steps of: coating the plastic sheet with a primary composition, the primary (or primer) composition comprising chlorinated aqueous olefin resin; baking the resulting plastic sheet; coating the baked sheet with a secondary composition, the secondary composition comprising aliphatic urethane; and baking the resulting plastic sheet.

Compared with the conventional three-step processes, these two-step processes of the present invention can provide an improved aqueous coating on a plastic sheet surface. In particular, the coated sheets according to the present invention have excellent light resistance, scratch resistance, and superior thermoforming properties such as high elongation. In addition, the coated sheets do not cause environmental contamination because they, unlike coated sheets prepared by conventional methods, do not include volatile organic compounds.

Reference will now be made in detail to the preferred embodiment of the present invention, examples of which are illustrated in the drawings attached hereinafter. The embodiments are described below so as to explain the present invention by referring to the figures.

First, the plastic sheet having excellent properties such as elasticity, heat resistance and elongation mainly contains a polyurethane resin. Examples of such sheet include, but not limited to, TWD-300 manufactured by DUO Inc., UD-200 manufactured by MegaChem Inc.

The plastic sheet may preferably comprise 40-65 weight % of water dispersible polycarbonate urethane dispersion, 2-10 weight % of water dispersible polyisocyanate crosslinking agent, 5-20 weight % of silicon oxide or urea polymer, 0.1-1.0 weight % of antifoaming agent, 1-5 weight % of leveling agent, and 0.5-2.0 weight % of thickening agent.

Water dispersible polyester urethane dispersions generally used in the art can be used. They have excellent mechanical properties such as impact resistance, flexibility, scratch resistance, etc. They can readily be fabricated with polymer including hard and soft ones, thus having been widely used as plastic paint materials. Preferably, in the present invention, the water dispersible polyester urethane dispersions having a number-average molecular weight of 30,000 to 50,000, and more preferably, 35,000, 38,000, 40,000 and 45,000 are used. If the molecular weight of the resin is less than 30,000, the elongation can be decreased and the resin can become harder, whereas if it is more than 50,000, the hardness can be decreased and the properties such as wear resistance and the like can be deteriorated.

Since the present invention requires excellent mechanical properties such as wear resistance, scratch resistance, light resistance, etc., and chemical properties such as chemical resistance, etc., it is necessary to provide a crosslinking density above a certain level to thereby maintain a flexible and elastic coated film. Accordingly, it is important that the flexibility and densification of the coated film of the water dispersible polyester-polyurethane dispersion be continuously maintained after being crosslinked with a hardening agent.

Preferably, the water dispersible polycarbonate urethane dispersion is used in an amount of 40-65 weight %. The amount less than 40 weight % can harm the film properties due to the deterioration of crosslinking density of the coated film. By contrast, the amount more than 65 weight % can deteriorate the painting workability.

To form a coated film of the water dispersible polycarbonate-polyurethane dispersion, a crosslinking agent can be used for providing a linkage with hydroxyl groups. In the present invention, it is desirable to use dispersible block-isocyanate by mixing a cross-linking agent of 18% content or 8% content with each other. Owing to the reaction between the isocyanate and hydroxyl groups, a solid polyurethane film can be formed. The isocyanate is also reacted with water to form a polyurea. Consequently, the reaction produces a polyurethane film with the structure in which polyurethane and polyurea are entangled reticularly with each other. In addition to the polyisocyanate, it is also possible to form a crosslinkage by using a hardening agent such as aziridines, carboimides, etc.; however, the resulting film shows inferior properties such as textureless, light resistance, chemical resistance, etc.

Since the crosslinkage of the water dispersible polycarbonate-polyurethane dispersion is accompanied with an addition reaction, it is necessary to set the rate of reaction between isocyanate and hydroxyl groups (NCO/OH) to a range of 1.3 to 1.8. A reaction rate of less than 1.3 can deteriorate the film properties such as wear resistance, chemical resistance, etc. In contrast, a reaction rate of more than 1.8 can make the coated film harder, deteriorating the textureness.

The crosslinking agent of the water dispersible polyisocyanate is generally used in the art as a hardening agent and it has an excellent miscibility with the water dispersible polycarbonate urethane dispersion. As a hardening agent, the water dispersible isocyanate having an excellent miscibility may be used. For example, Aquacure 4002B available from Sungwon Specialty Corporation, DBI-10 available from Duo Inc., etc. may be used.

Such water dispersible polyisocyanate is used in an amount of 2-20 weight %. If the amount is less than 2 weight %, the basic properties can be deteriorated, whereas if it is more than 20 weight %, drying of the coated film can be adversely affected.

The aqueous coating composition for vehicle interior equipment of the present invention may be used as, for example, a paint for indoor use, a low gloss of 1.2-1.8' is required based on a gloss of 60° in appearance. In general, the degree of gloss is influenced by various factors such as roughness of film surface, solvent evaporation, shape of film shrinkage, painting process, temperature and humidity conditions, composition of solvent and additive, etc. Among them, roughness of film surface is considered as a primary factor.

To obtain the desired effects of the surface roughness, various materials such as silica, talc, calcium carbonate, etc., are generally used in paints. After applying the painting material on the resin, a matting agent is spread uniformly to the wet film. As the solvent or water evaporates, the thickness of the coated film decreases. As the coated film contracts, a rough surface of the matting agent is shown. It can be identified whether the gloss made is high or low when the irradiated light is diffused on the rough surface.

Silicon oxides or urea polymers of the present invention are used for providing the matting effect and, at the same time, for complementing the textureness and the wear resistance. Preferably, silicon oxides have a particle diameter of 2-10μ. A particle diameter of less than 2μ can make it to control the gloss. On the other hand, a particle diameter of more than 10μ can bring defective appearance (e.g., rough surface).

Micronized silicon oxides, an ingredient for reducing the gloss of the coated film, can be classified into annealed, settled, organic coated, fumed, wax coated silicon oxide, gel, etc. based on the manufacturing process. To ensure the properties such as transparency of dried film, matting efficiency, scratch resistance, etc., it is desirable to use a micronized silicon oxide made through an annealing process to achieve an excellent hardness property. Wax coated silica may improve the surface textureness; however, it may deteriorate the clarity of image on the dried film. Porous properties of silicon oxide show a high matting efficiency. However, if it is used in great quantities, it may absorb resin powders, thereby deteriorating adhesion or flexibility of the film. Moreover, since it is amorphous, it may form an irregular film on the surface, thereby reducing scratch resistance.

The urea polymer may be a urea formaldehyde polymer. A preferred urea formaldehyde polymer may have 0.6% of reactive methylol groups, a density of 1.41-1.45 g/cm$^3$, a bulk density of 60-70 g/l, and a specific surface area of 20±3 m$^2$/g (BET method). The polymer is an organic material readily available and has excellent matting efficiency as well as superior dispersibility against water, compared with inorganic silica. As a result, it is possible to obtain a coated film having uniformly distributed particles, excellent appearance, and improved scratch resistance and wear resistance.

The thus-obtained coating materials have excellent light resistance, scratch resistance and thermoforming properties of high elongation. They particularly provide superior adhesion with thermoplastic polycarbonate urethane (TPO) without using a primary (or primer) coating.

Silicon oxides or urea polymers are used in an amount of 5-30 weight %. If the amount is less than 5 weight %, the gloss can become higher, whereas if it is more than 30 weight %, the adhesion efficiency can be deteriorated.

Besides, additives may be used for enhancing the stability during the preservation of paints and for improving the appearance quality after the painting process. For example, 0.1-5.0 weight % of antifoaming agent including mineral oil, silicon and the like, 1-10 weight % of silicon or non-silicon leveling agent and 0.5-10.0 weight % of urethane thickening agent may be used. If the antifoaming agent is used in an amount less than 0.1 weight %, paint bubbles can be hard to disappear, whereas if it is used in an amount more than 5.0 weight %, it may cause a problem of cratering. If the leveling agent is used in an amount less than 1 weight %, an "orange peel" can occurs in appearance, whereas if it is used in an amount more than 10 weight %, it can produce a quite contrary result. Since the thickening agent is used for regulating the viscosity, it should be used by applying an appropriate viscosity and the above range is preferred.

Next, the primary (or primer) composition may comprise 30-65 weight % of chlorinated aqueous olefin resin, 2-10 weight % of polyurethane resin, 1-5 weight % of aqueous silicon resin, 0.5-2.0 weight % of aqueous stabilizing agent and 30-60 weight % of distilled water.

Chlorinated aqueous olefin resins generally used in the art to provide properties of excellent adhesion, workability and elongation can be used. Such olefin resins have a chlorine content of 25-50% and a carbon number of 1-10. For example, Hardlen manufactured by Toyo Kasei Co., Ltd., Superchlon manufactured by Nippon Paper Chemical Co., Ltd., TWD-P100 manufactured by Duo Inc. and the like may be used.

Preferably, in the present invention, the chlorinated aqueous olefin resin may be used in an amount of 30-65 weight %. If the amount is less than 30 weight %, an adhesion defect can occur, whereas if it is more than 65 weight %, no additional benefit can entail.

Also preferably, polyurethane resins having excellent elongation properties may be used for the painting workability. For instance, TWD-300, HWU-101A available from Duo Inc., etc. may be used.

The polyurethane resin may be used in an amount of 2-10 weight %. If the amount is less than 2 weight %, the elongation of paint can be decreased, whereas if it is more than 10 weight %, the adhesion efficiency can be decreased.

As an aqueous silicon resin, urethane resin having silicon groups may preferably be used for improving the appearance of paint. For example, TWD-200 manufactured by Duo Inc., etc. may be used.

Such aqueous silicon resin may be used in an amount of 1-5 weight %. If the amount is less than 1 weight %, the leveling efficiency can be decreased, whereas if it is more than 5 weight %, the leveling efficiency also can be decreased.

Suitably, an aqueous stabilizing agent that can regulate the viscosity may be used for ensuring the preservability of paint and. For instance, KB-201A available from Synthron Inc., RM-825, RM-812 available from Rohm & Haas Co. and the like may be used.

A preferred amount of the aqueous stabilizing agent is 0.2-5.0 weight %. If the amount is less than 0.2 weight %, it is not easy to regulate the viscosity, whereas if it is more than 5.0 weight %, defective adhesion can occur.

Distilled water may be used in an amount of 30-60 weight %. The amount of distilled water does not affect the properties of the composition significantly.

Next, the secondary composition of the present invention may be a thermoplastic polycarbonate urethane composition. Preferably, it may comprise 40-60 weight % of aliphatic urethane, 0.1-5.0 weight % of silicon polyol for reforming aliphatic urethane, 3-5 weight % of N-methyl-2-pyrolidone, 0.1-1.0 weight % of neutralizing agent and 30-50 weight % of distilled water.

The aliphatic urethane can be prepared by applying a raw material including aliphatic substituents having a carbon number of 80-120. Preferably, aliphatic urethane having an elongation within the range of 600 to 900 may be used for ensuring the elongation of paint. For instance, WPS-10 manufactured by SR Chemn, HWU-101A manufactured by Hepce Chem Co., Ltd., etc. may be used.

A preferred amount of aliphatic urethane is 40-60 weight %. If the amount is less than 40 weight %, the adhesion can be decreased, whereas if it is more than 60 weight %, defective appearance can occur.

The silicon polyol for reforming aliphatic urethane can be prepared by bonding silicon groups to carbon chain terminals of urethane resin. Urethane resin is used for improving scratch resistance of paint. TWD-300 available from Duo Inc., for example, may be used.

Preferably, silicon polyol for reforming aliphatic urethane is used 0.1-5.0 weight %. If the amount is less than 0.1 weight %, the scratch resistance can be decreased, whereas if it is more than 5.0 weight %, a fogging problem can occur.

Suitably, the N-methyl-2-pyrolidone may be used in an amount of 3-5 weight % for ensuring the preservability of paint. An amount of less than 3 weight % can decrease the preservability in winter. By contrast, an amount of more than 5 weight % can cause an odor problem.

Besides, the distilled water is used 30-50 weight %. The amount of distilled water does not affect the properties of the composition significantly.

Figure 2:
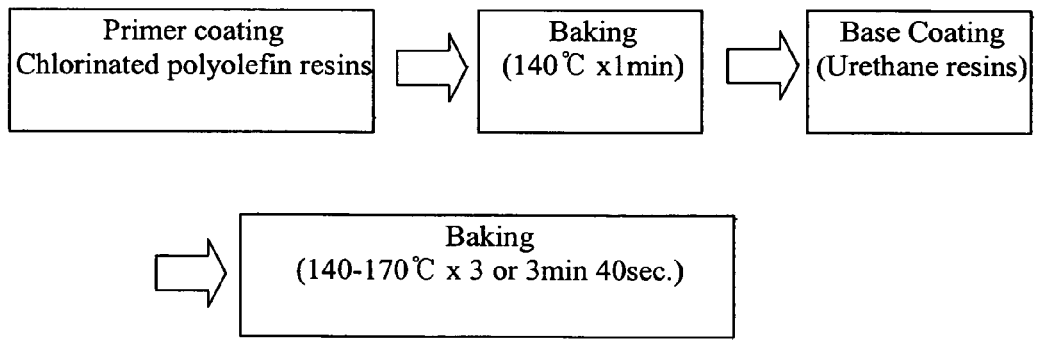
FIG. 2 is a schematic diagram illustrating a coating two-step coating method in accordance with the present invention.

As illustrated in FIG. 2, an aqueous primary (or primer) composition and an aqueous secondary composition are coated twice in turn (i.e. first coating-first baking-second coating-second baking) on the plastic sheet surface prepared as above. It is to be noted that the present process is carried out at 130-150° C. for one to two minutes, while conventional processes are carried out at 180° C. for three minutes. If the above condition is not kept, defective adhesion can occur.

The aqueous primary composition is used in an amount of 10-30 parts by weight relative to 100 parts by weight of plastic sheet. If the amount is less than 10 parts by weight, defective adhesion can occur, whereas if it is more than 30 parts by weight, defective drying can occur.

The aqueous secondary composition is used in an amount of 20-40 parts by weight relative to 100 parts by weight of plastic sheet. If the amount is than 20 parts by weight, the basic properties can be deteriorated, whereas if it is more than 40 parts by weight, scratch and fogging problems can entail.

Furthermore, the process for the thermoplastic polycarbonate urethane composition is performed at 140-150° C. for three minutes to three minutes and forty seconds. The condition of which is milder than that of conventional processes (i.e., 180° C.×3 min). If the above condition of the present invention is not maintained, the properties may be deteriorated.

As described above, it is possible to form a coated film having excellent light resistance, scratch resistance and particularly superior thermoforming properties of high elongation.

The following examples are presented to illustrate further various aspects of the present invention, but are not intended to limit the scope of the invention in any aspect.

PREPARATION EXAMPLES 1 TO 3

Preparation of Plastic Sheets

Plastic sheets were prepared. The ingredients and the content are shown in Table 1.

TABLE 1

| Plastic Sheet Ingredients | Name of Ingredients | Preparation Example (Weight %) | | |
|---|---|---|---|---|
| | | 1 | 2 | 3 |
| Water dispersible polyester urethane dispersion | WPS-10 of SR Chem | 30 | 32 | 40 |
| Water dispersible polyisocyanate | DBI-10 of Duo | 4 | 4 | 3 |
| Silicon oxide | TS-100 of Degussa | 7 | 6 | 7 |
| Antifoaming agent | Surfynol 104 of Air Product | 0.6 | 0.5 | 0.5 |
| Leveling agent | BYK-344 of BYK | 1 | 3 | 1 |
| Thickening agent | RM-825 of Rohm&Haas | 2 | 0.5 | 1 |
| Distilled water | D.I. Water | 55.4 | 54 | 47.5 |

PREPARATION EXAMPLES 4 TO 6 AND COMPARATIVE PREPARATION EXAMPLE 1

Preparation of Primary Compositions

The ingredients with the content ranges shown in Table 2 were mixed with each other and stirred at 2,500 rpm for one hour to prepare each of the primer compositions.

TABLE 2

| Primary composition ingredients | Name of Ingredients | Preparation Examples (Weight %) | | | Comparative Preparation Example |
|---|---|---|---|---|---|
| | | 4 | 5 | 6 | 1 |
| Polyolefin resin | 40% Chlorinated ethylene resin | 30 | 40 | 50 | 65 |
| Polyester resin | HWU-101A of Hepce Chem | 2 | 2 | 2 | 6.8 |
| Wetting agent | Dynol-604 of Air Product | 0.2 | 0.2 | 0.2 | 0.2 |
| Dispersing agent | BYK-191 of BYK | 0.5 | 0.5 | 0.5 | 0.5 |
| Antifoaming agent | DF-58 of Air Product | 0.5 | 0.5 | 0.5 | 0.5 |
| Thickening agent | RM-825 of Rohm&Haas | 8 | 8 | 8 | 8 |
| Matting agent | AZ-260 of Nipsil | 1.8 | 2 | 3 | 3 |
| Distilled water | D.I. Water | 57 | 46.8 | 35.8 | 16 |

PREPARATION EXAMPLES 7 TO 9 AND COMPARATIVE PREPARATION EXAMPLE 2

Preparation of Secondary Compositions

The ingredients with the content ranges shown in Table 3 were mixed with each other and stirred at 2,400 rpm for one hour to yield each of the secondary compositions.

TABLE 3

| Secondary composition ingredients | Name of Ingredients | Preparation Examples (Weight %) | | | Comparative Preparation Example |
|---|---|---|---|---|---|
| | | 7 | 8 | 9 | 2 |
| Aliphatic urethane | Urethane resin including alkyl substituents having a carbon number of 100 (Elongation 800%) | 40 | 50 | 60 | 82.6 |

TABLE 3-continued

| Secondary composition ingredients | Name of Ingredients | Preparation Examples (Weight %) | | | Comparative Preparation Example |
|---|---|---|---|---|---|
| | | 7 | 8 | 9 | 2 |
| Silicon polyol | TWD-300 of Duo | 0.3 | 0.3 | 0.3 | 0.3 |
| Wetting agent | Dynol-604 of Air Product | 0.1 | 0.1 | 0.1 | 0.1 |
| Dispersing agent | BYK-191 of BYK | 0.5 | 0.5 | 0.5 | 0.5 |
| Antifoaming agent | DF-58 of Air Product | 0.5 | 0.5 | 0.5 | 0.5 |
| Thickening agent | RM-825 of Rohm&Haas | 2 | 2 | 2 | 2 |
| Matting agent | AZ-260 of Nipsil | 8 | 8 | 8 | 8 |
| UV-stabilizing agent | TIN#1130 of Ciba | 1 | 1 | 1 | 1 |
| Neutralizing agent | TEA of BASF | 5 | 5 | 5 | 5 |
| Distilled water | D.I. Water | 42.6 | 32.6 | 22.6 | 0 |

COATING EXAMPLES 1 TO 3 AND COMPARATIVE COATING EXAMPLE 1

Method of Coating

A coating process was carried out on the plastic sheet, primary composition and secondary composition prepared in the above preparation examples.

First, the primary composition was coated on the plastic sheet using bar coating at 140° C. for one minute and, then, the secondary composition was coated thereon using bar coating at 140° C. for two minutes.

Coating Example 1 was carried out using those prepared in Preparation Examples 1, 4 and 7. Coating Example 2 was performed using those prepared in Preparation Examples 2, 5 and 8. Coating Example 3 was carried out using those prepared in Preparation Examples 3, 5 and 8. Comparative Coating Example 1 was carried out using those prepared in Preparation Example 1, Comparative Preparation Examples 2 and 3, respectively. The primary compositions were used in an amount of 10 weight % and the secondary compositions were used in an amount of 20 weight % relative to the plastic sheet.

Properties of the thus-obtained films were measured using a thermoforming tester in the following manner and the results are depicted in Table 5.

Manner of Testing Properties (1) Appearance: Defects such as swellings, bubbles, spots, coating stains, orange peels, cracks, etc., were detected with the naked eye at an intensity of illumination over 300lx, at a visual distance of 300 mm and with a fixed vision over 0.8.

(2) Initial adhesion: Eleven horizontal and vertical parallel lines were drawn at 1 mm intervals to intersect each other on the central coated surface pursuant to KS M 5918, thus making 100 square graduations. Then, cellophane tape was adhered closely thereto, and then stripped off in the vertical direction at a time to measure the number of graduations that were not exfoliated.

(3) Initial gloss: Specular gloss at 60° was measured pursuant to KS M 5000 testing method.

(4) Humidity resistance: The test sample was kept in saturated steam under the condition of 50±2° C., 98±2% RH for 168 hours and taken out to be left at room temperature for one hour, and then the changes in appearance were observed pursuant to the conditions in item (1).

(5) Heat and aging resistance: The test sample was kept in a constant temperature bath under the condition of 110±2° C. and taken out to be left at room temperature for one hour, and then the changes in appearance were observed pursuant to the conditions in item (1).

(6) Light resistance: After irradiation with a Fade-O-Meter (a xenon arc tester defined in ISO 105, black panel, temperature: 89±3+ C.) at 126 MJ/m$^2$, the changes in appearance were observed pursuant to the conditions in item (1) and the differences of discolorations were assessed with the grey scale for color change of KS K 0911 to graduate.

(7) Scratch: The surface of test sample was scratched under the condition depicted in Table 4 pursuant to the method defined in JIS K 6718 and wiped with wet gauze to observe the scratched surface.

TABLE 4

| Items | Conditions |
|---|---|
| Load (Nkg$_f$) | 2.94 (0.3) |
| Stroke (mm) | 100 ± 5 |
| Friction velocity (mm/sec) | 100 |
| Scratch tip | Tip angle: 60° |
| | Tip: 0.3R |
| | Tip material: Sapphire |
| Frequency of scratching | 1 time |

(8) Odor assessment: The test sample of 4 cm×7 cm in size was coated on a glass plate and put into a 4 l airtight vessel, to which heat was applied at 100±2° C. for two hours. Subsequently, the test vessel was left at room temperature (e.g., 23±2° C.) for one hour, and then odors were assessed. Here, the odor test was made by five persons into five grades. Assessment was carried out by subtracting the number of persons who smelled odors from five, in which the highest grade meant that there were no odors.

TABLE 5

| Assessment Items | Coating Examples | | | Comparative Coating Example |
|---|---|---|---|---|
| | 1 | 2 | 3 | 1 |
| Appearance | Bad | Good | Good | Good |
| Initial adhesion | Good | Good | Good | Good |
| Initial gloss | 0.8 | 1.0 | 1.2 | 1.3 |
| Humidity resistance | Good adhesion | Good adhesion | Good adhesion | Good adhesion |
| Heat and aging resistance | Good | Good | Good | Good |
| Light resistance | Decreased gloss | Good | Good | Good |
| Scratch resistane | Good | Good | Good | Good |
| Elongation | 620% | 650% | 700% | 400% |
| Odor | Grade 4 | Grade 4 | Grade 4 | Grade 2 |

As depicted in Table 5 above, it can be seen that the elongation and odor of the coated films of Coating Examples 1 to 3 are remarkably improved compared with those in Comparative Coating Example 1. Particularly, appearance and light resistance of the coated films of Coating Examples 2 and 3 are more satisfactory than those in Example 1.

As described above, the present invention provides a method of aqueous coating of a plastic sheet surface for vehicle interior equipment that forms a coated film having excellent light resistance, scratch resistance and superior thermoforming properties of high elongation, and further prevents environmental contamination by performing a coating process in two steps on the plastic sheet surface using an aqueous primer (or primary) composition and an aqueous thermoplastic polycarbonate urethane (or secondary) composition. Especially, the painting materials of the present invention, when applied to vehicle interior equipment, can prevent the odors of vehicle interior and paints generated in a brand-new car what are called new car odors, thereby increasing the user's satisfaction.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of forming a coating on a plastic sheet surface for vehicle interior equipment, comprising the steps of:
    coating the plastic sheet with a primary composition, the primary composition comprising chlorinated aqueous olefin resin;
    baking the resulting plastic sheet;
    coating the baked sheet with a secondary composition, the secondary composition comprising aliphatic urethane; and
    baking the resulting plastic sheet,
    wherein the primary composition comprises 30-65 weight % of chlorinated aqueous olefin resin, 2-10 weight % of polyurethane resin, 1-5 weight % of aqueous silicon resin, 0.5-2.0 weight % of aqueous stabilizing agent and 30-60 weight % of distilled water; and
    the secondary composition comprises 40-60 weight % of aliphatic urethane, 0.1-5.0 weight % of silicon polyol for reforming aliphatic urethane, 3-5 weight % of N-methyl-2-pyrolidone, 0.1-1.0 weight % of neutralizing agent and 30-50 weight % of distilled water.

2. The method of claim 1, wherein the plastic sheet is a polyurethane comprising 40-65 weight % of water dispersible polyester urethane dispersion, 2-20 weight % of water dispersible polyisocyanate crosslinking agent, 5-30 weight % of silicon oxide or urea polymer, 0.1-5.0 weight % of antifoaming agent, 1-10 weight % of leveling agent and 0.5-10.0 weight % of thickening agent.

3. The method of claim 1, wherein the chlorinated aqueous olefin resin has a chlorine content of 10% to 30% and a carbon number of 1 to 10.

4. The method of claim 1, wherein the aliphatic urethane has a carbon number of 80-120 and an elongation of 600% to 900%.

5. The method of claim 1, wherein the baking after the coating with primary composition is carried out at 130-150° C. for one to two minutes.

6. The method of claim 1, wherein the baking after the coating with the secondary composition is carried out at 140-150° C. for two minutes to three minutes and forty seconds.

7. The method of claim 1, wherein 10-30 parts by weight of the primary composition relative to 100 parts by weight of the plastic sheet is used.

8. The method of claim 1, wherein 20-40 parts by weight of the secondary composition relative to 100 parts by weight of the plastic sheet is used.

9. The method of claim 1, wherein 20-30 parts by weight of the secondary composition relative to 100 parts by weight of the plastic sheet is used.

10. The method of claim 1, wherein the aqueous coated plastic sheet has an elongation of 600-800% and a gloss of 1.2-1.8' based on a 60° gloss in appearance.

* * * * *